United States Patent [19]
Gale

[11] Patent Number: 5,658,102
[45] Date of Patent: Aug. 19, 1997

[54] HOLE SAW ARBOR METHOD AND APPARATUS

[75] Inventor: Ronald D. Gale, Athol, Mass.

[73] Assignee: The L. S. Starrett Company, Athol, Mass.

[21] Appl. No.: 526,916

[22] Filed: Sep. 12, 1995

[51] Int. Cl.$^6$ .............................. B23B 35/00; B23B 51/04
[52] U.S. Cl. .......................... 408/1 R; 408/204; 408/209
[58] Field of Search .................................. 408/1 R, 204, 408/206, 207, 209, 703

[56] References Cited

U.S. PATENT DOCUMENTS

| | | | |
|---|---|---|---|
| 3,758,221 | 9/1973 | Meshulam | 408/204 |
| 3,854,840 | 12/1974 | Miyanaga | 408/204 |
| 4,148,593 | 4/1979 | Clark | 408/204 |
| 4,669,928 | 6/1987 | Mediavilla | 408/204 |
| 5,226,762 | 7/1993 | Ecker | 408/209 |

FOREIGN PATENT DOCUMENTS 2257381  1/1993  United Kingdom ................... 408/204

OTHER PUBLICATIONS

Brochure, Starrett, "Hole Saw Kits & Accessories" and Diamond & Carbide Hole Saws, pp. 23–24.
Brochure, Black & Decker, "Hole Saws", pp. 26–27.
Brochure, Blu–Mol, "Hole Saws for All Applications", p. 3.
Brochure, Sterling, "Hole Saw Kits", p. A–15.
Brochure, Sawell, "Holesaw Kits & Accessories", p. 22.

*Primary Examiner*—Daniel W. Howell
*Attorney, Agent, or Firm*—Fish & Richardson PC

[57] ABSTRACT

A hole saw arbor includes an arbor body defining an axial rotation axis and has, at one end, a shank for mounting to a drill chuck, and at the other end, a hole saw receiving, axially directed, threaded shaft. The arbor includes a thrust member coaxially received by the arbor body such that the thrust member is movable in the direction of the rotation axis. The arbor further has at least one movable pin retained by the arbor body in the direction of the threaded shaft for engaging a corresponding hole in a bottom surface of the hole saw, to prevent rotation of the hole saw relative to the arbor body; and an adjustable locking member for locking the thrust member against the bottom surface of the hole saw. Thereby the hole saw, when engaged by the thrust member and the at least one pin, does not wobble off-axis.

18 Claims, 4 Drawing Sheets

HOLE SAW ARBOR METHOD AND APPARATUS

BACKGROUND OF THE INVENTION

The invention relates generally to hole saw arbors and more particularly to a method and apparatus for mounting a hole saw to a hole saw arbor.

It has been known to provide hole saw arbors with pin locking mechanisms to prevent on-axis rotation of the hole saw relative to the arbor. Nevertheless, off-axis wobble still exists. In high speed applications, off-axis wobble causes vibration which can effectively reduce the life of the hole saw, the arbor, and even the drill itself. The vibration also reduces the accuracy of the cut.

SUMMARY OF THE INVENTION

The invention relates to a hole saw arbor for preventing off-axis wobble of a hole saw. The invention features a hole saw arbor including an arbor body defining an axial rotation axis. The arbor body has, at one end, a shank for mounting to a drill chuck, and, at the other end, a hole saw receiving, axially directed, threaded shaft. The hole saw arbor further features a thrust member coaxially received by the arbor body such that, the thrust member is movable in the direction of the rotation axis. At least one movable pin is retained by the arbor body in the direction of the threaded shaft for engaging a corresponding hole in a bottom surface of the hole saw to be mounted to the shaft, to prevent rotation of the hole saw relative to the arbor body. An adjustable locking member locks the thrust member against the bottom surface of the hole saw when the hole saw is engaged with the pin or pins. Thereby the hole saw, when engaged by the thrust member and the pin or pins, does not wobble off-axis, thereby reducing vibration.

In particular embodiments of the invention, the arbor body defines a central coaxially directed bore for receiving a drill bit. The arbor body defines a side bore oriented perpendicular to the central bore for receiving a screw for locking the drill bit in the central bore.

The arbor body includes an enlarged region defining an axially oriented, off-center, through-bore for retaining the pin or pins. The pin or pins retained by the arbor body is integrally associated with the thrust member, and movement of the thrust member into engagement with the bottom surface of the hole saw extends the pin or pins through the arbor body through-bore and into the corresponding hole(s) in the bottom surface of the hole saw. The pin or pins and the thrust member are constructed and arranged such that the pin(s) extend into the corresponding hole(s) in the bottom surface of the hole saw before the thrust member engages the bottom surface of the hole saw.

In another aspect, the thrust member includes an collar defining a central hole coaxially received by the enlarged region of the arbor body.

In one preferred illustrated embodiment, the hole saw arbor further includes two movable pins retained by the arbor body in the direction of the threaded shaft for engaging corresponding holes in the bottom surface of the hole saw to be mounted to the shaft.

The invention also features a method of mounting a hole saw to a hole saw arbor including the steps of threading the hole saw onto a threaded shaft of the arbor, rotationally fixing the hole saw relative to the threaded shaft, and engaging a bottom surface of the hole saw to lock the hole saw in a longitudinal position.

In one preferred illustrated embodiment, the engaging step includes slidably moving a thrust member into contact with the bottom surface of the hole saw, and locking the thrust member in an operative position in contact with the bottom surface.

BRIEF DESCRIPTION OF THE DRAWINGS

Other objects, features and advantages of the invention will be apparent from the following description taken together with the drawings in which.

DESCRIPTION OF THE PREFERRED EMBODIMENT

Figure 1:
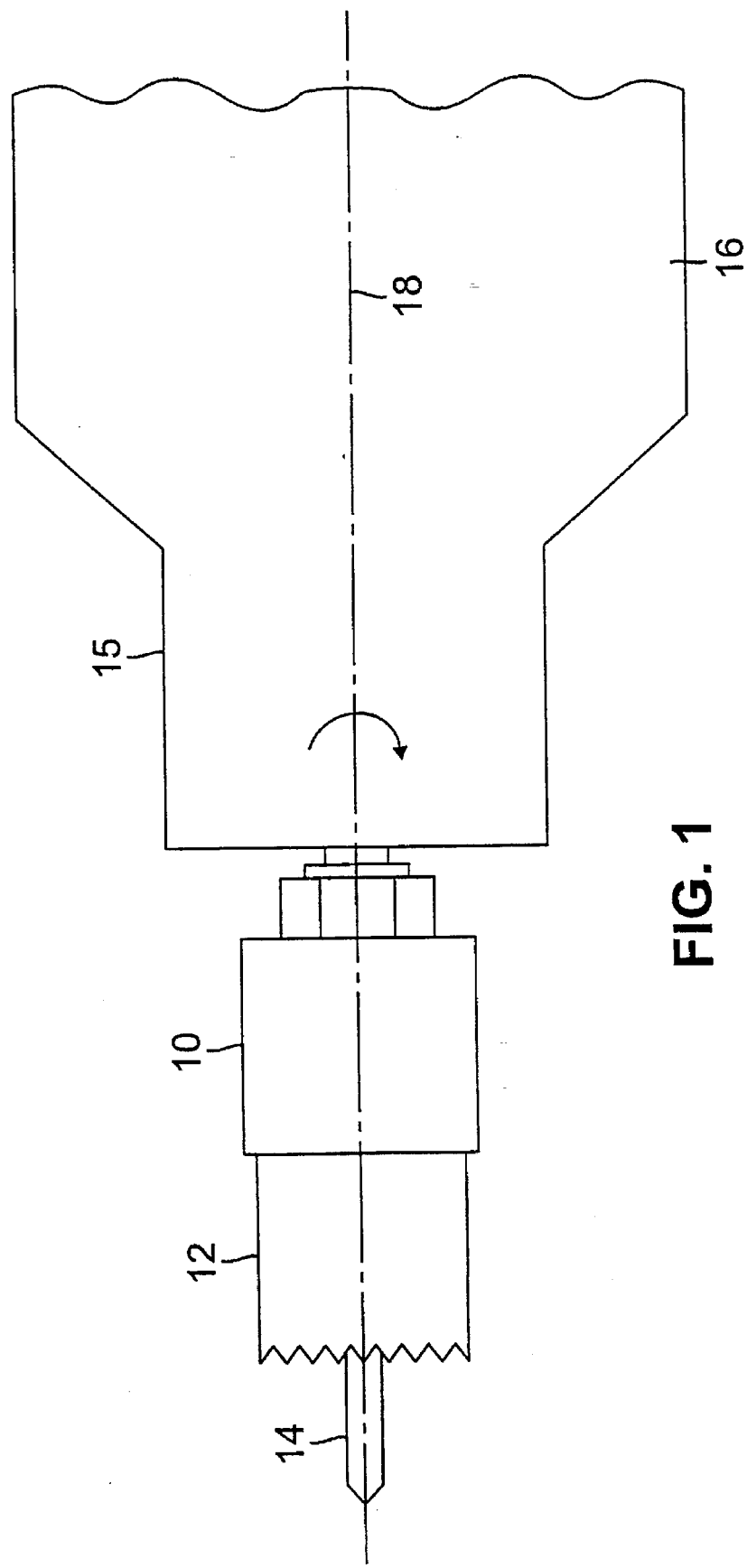
FIG. 1 is a diagrammatic representation of the hole saw arbor of the invention coupling a hole saw and a drill bit to a drill chuck.

Referring to FIG. 1, a hole saw arbor 10 couples a hole saw 12 and a drill 14 to a drill chuck 15 and a motor driver 16. Hole saw arbor 10 mounts hole saw 12 and drill 14 for rotation about an axis 18 while preventing off-axis wobble of hole saw 12 about axis 18. Hole saw arbor 10 can be made from, for example, hardened steel.

Figure 2:
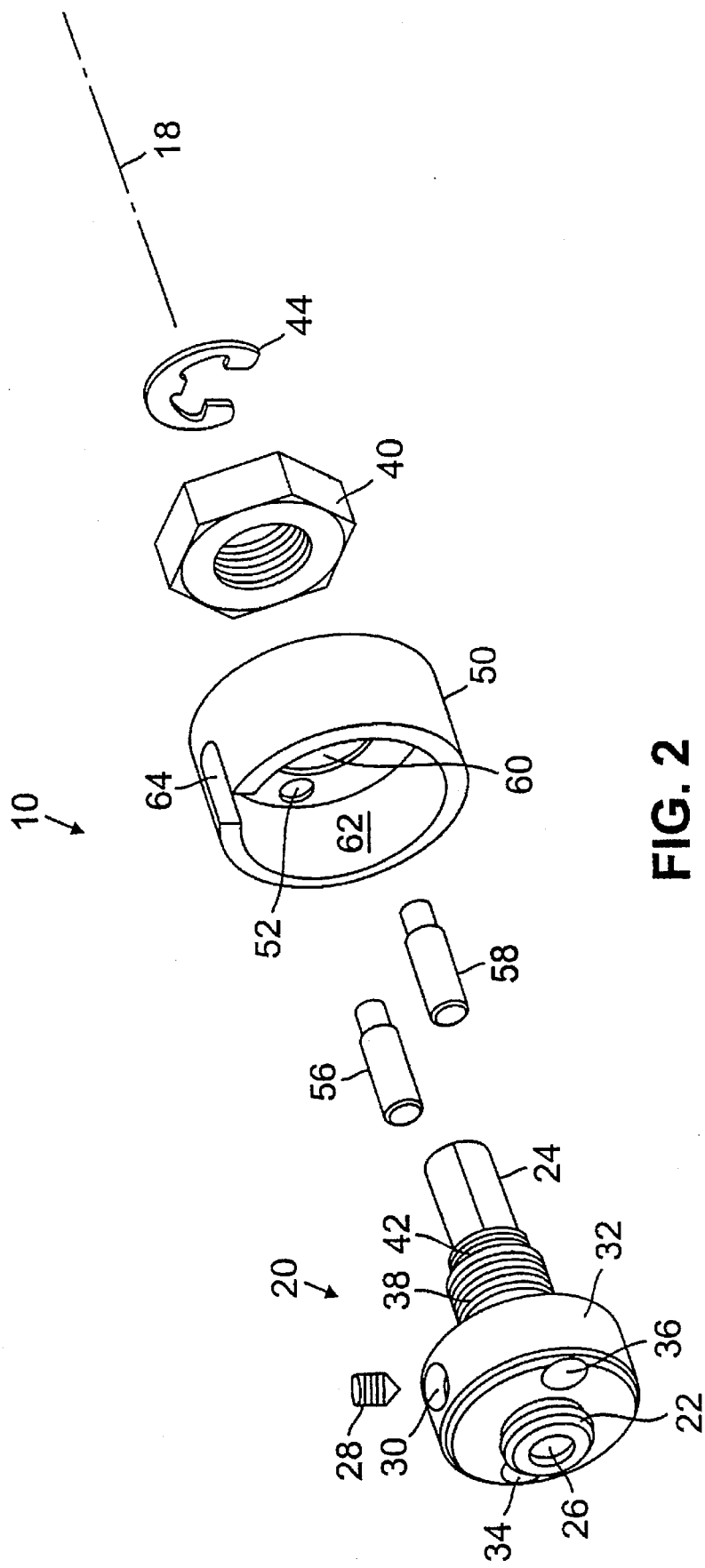
FIG. 2 is an exploded view of the hole saw arbor of the invention.

Referring to FIG. 2, hole saw arbor 10 includes an axial arbor body 20 including a threaded portion 22 for attachment to hole saw 12 and an hexagonal rod 24 for attachment to drill chuck 15. A bore 26 in arbor body 20 receives drill 14 and a screw 28 threaded into a bore 30 holds drill 14 in place within bore 26. Arbor body 20 includes an enlarged region 32 defining bore 30 and two additional holes 34, 36 oriented parallel to axis 18. There is a threaded region 38 located between enlarged region 32 and hexagonal rod 24 for receiving a nut 40 and a threaded region 42, of a smaller diameter than threaded region 38, for receiving a lock washer 44. Lock washer 44 retains nut 40 on threaded region 38.

A thrust member, collar 50 in the illustrated embodiment, includes a central hole 60 slidably received over threaded region 38 of arbor body 20 and a central bore 62 slidable received over enlarged region 32 of arbor body 20. A slot 64 in collar 50 permits access to screw 28 when collar 50 is operatively positioned over enlarged region 32 (see FIG. 3). Collar 50 includes pin holes 52, 54 (see FIG. 4A) in which pins 56, 58 are press fit. Pins 56, 58 are slidably received within pin holes 34, 36 in arbor body 20. Pins 56, 58 extend into corresponding pin holes in hole saw 12 to prevent axial rotation of hole saw 12 with respect to arbor body 20 as is well known in the art.

Figure 3:
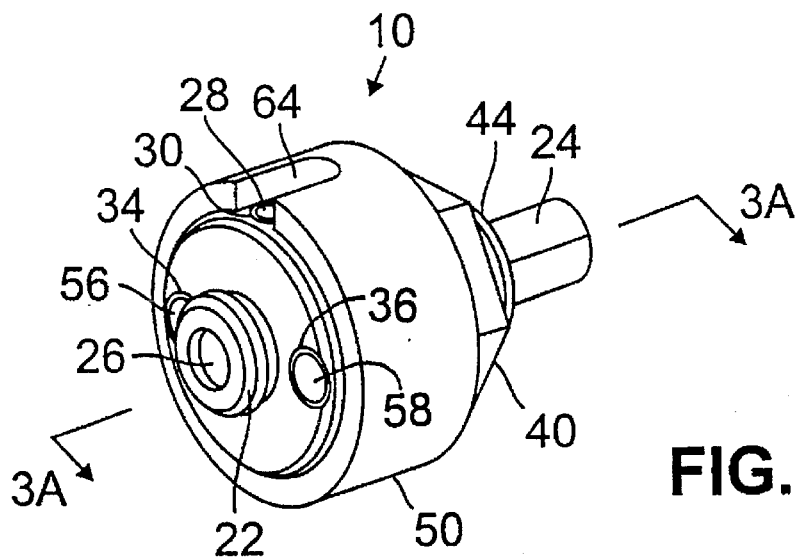
FIG. 3 is a perspective view of the hole saw arbor of the invention shown in a hole saw attaching position.
Figure 3A:
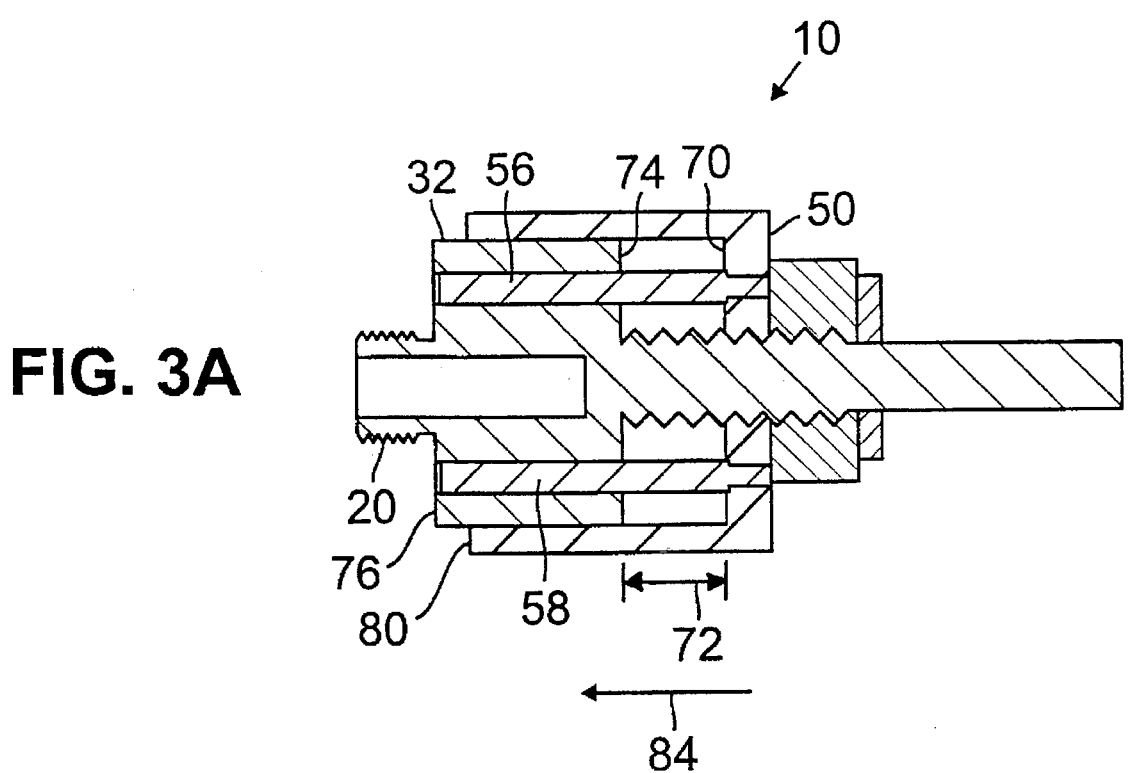
FIG. 3A is a cross-sectional view taken along line 3A—3A of FIG. 3.

Referring to FIGS. 3 and 3A, before attachment to hole saw 12, hole saw arbor 10 is assembled with an inner face 70 of collar 50 spaced proximally a first distance 72 from a proximal face 74 of enlarged region 32. In this configuration, pins 56 and 58 do not extend pass a distal face 76 of enlarged region 32 and an outer face 80 of collar 50 is proximal of distal face 76.

To mount hole saw 12 to arbor 10, with arbor 10 in the configuration of FIG. 3, hole saw 12 is screwed onto threaded region 22 until the hole saw contacts distal face 76. Hole saw 12 is then backed off to align its pin holes with pins 56, 58. Collar 50 is then slid distally, in the direction of arrow 84, advancing pins 56, 58 into the corresponding pin holes in hole saw 12.

Figure 4:
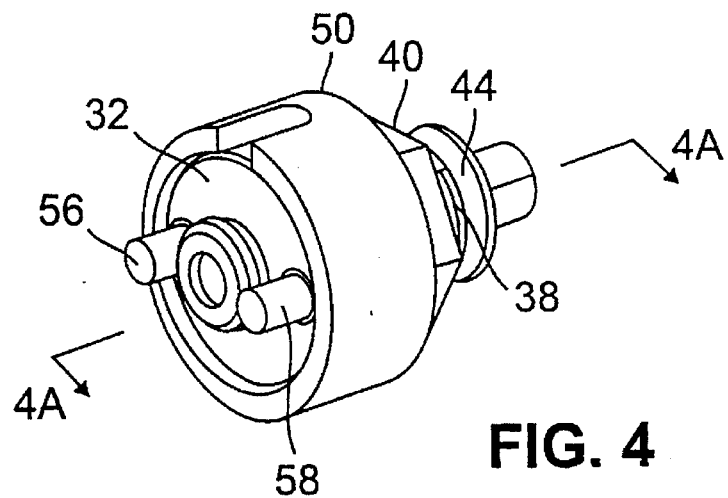
FIG. 4 is a perspective view of the hole saw arbor of the invention shown in a hole saw retaining position.
Figure 4A:
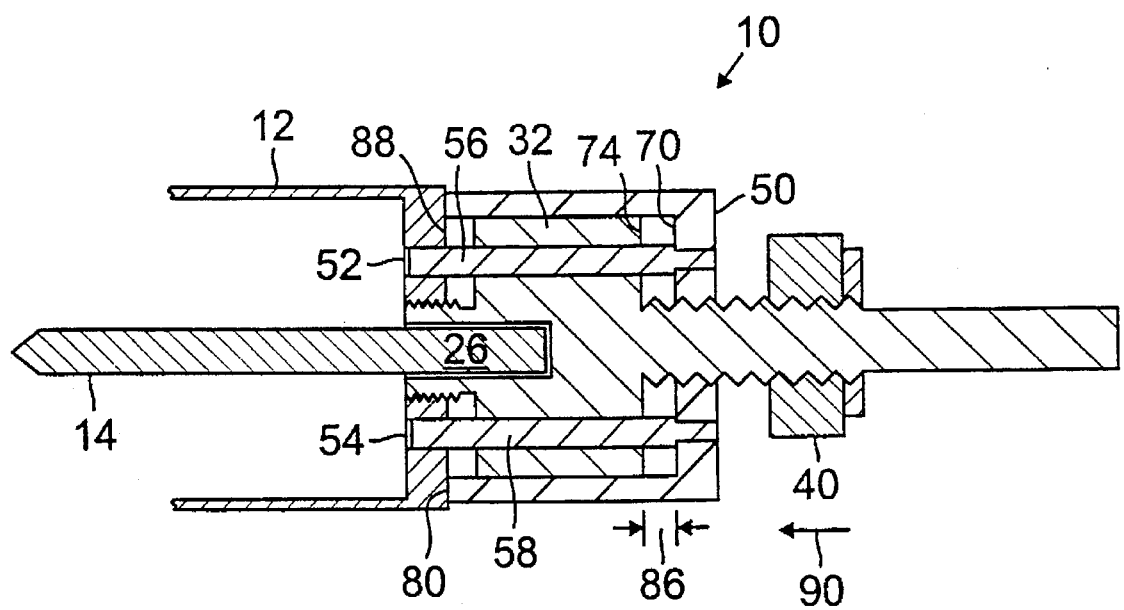
FIG. 4A is a cross-sectional view taken along line 4A—4A of FIG. 4 shown with a hole saw and a drill attached to the hole saw arbor of the invention.

Referring to FIGS. 4 and 4A, collar 50 is slid as far distally as possible such that inner face 70 of collar 50 is spaced proximally a second distance 86 from proximal face 74 of enlarged region 32. The distal movement of collar 50 is stopped by outer face 80 contacting the bottom surface 88 of hole saw 12. It is this contact which prevents off-axis wobble of hole saw 12. Outer face 80 of collar 50 is locked in the distal position by rotating nut 40 to move it in the direction of arrow 90. Drill 14 is then inserted into bore 26 and locked in place with screw 28.

Additions, subtractions and other modifications of the illustrated embodiments of the invention will be apparent to those practiced in the art and are within the scope of the following claims.

What is claimed is:

1. A hole saw arbor, comprising:
    an arbor body defining an axial rotation axis and including at one end, a shank for mounting to a drill chuck, and at the other end, a hole saw receiving, axially directed, threaded shaft,
    a thrust member, coaxially received by said arbor body, such that said thrust member is movable in the direction of said rotation axis,
    at least one movable pin retained by the arbor body in the direction of said threaded shaft for engaging a corresponding hole in a bottom surface of said hole saw to be mounted to said shaft, to prevent rotation of said hole saw relative to said arbor body when so engaged, and
    an adjustable locking member for locking said thrust member against the bottom Surface of said hole saw when said hole saw is engaged with said at least one pin,
    whereby the hole saw, when engaged by said thrust member and said at least one pin, does not wobble off-axis.

2. The hole saw arbor of claim 1 wherein said arbor body further defines a central coaxially directed bore for receiving a drill bit.

3. The hole saw arbor of claim 2 wherein said arbor body further defines a side bore oriented perpendicular to said central bore for receiving a screw for locking said drill bit in said central bore.

4. The hole saw arbor of claim 1 wherein said at least one pin is integrally associated with said thrust member.

5. The hole saw arbor of claim 1 wherein said arbor body includes an enlarged region defining an axially oriented, off-center, through-bore for retaining said at least one pin.

6. The hole saw arbor of claim 5 wherein said at least one pin retained by said arbor body is integrally associated with said thrust member and movement of said thrust member into engagement with the bottom surface of said hole saw extends said at least one pin through said arbor body through-bore and into the corresponding hole in the bottom surface of the hole saw.

7. The hole saw arbor of claim 6 wherein said at least one pin and said thrust member are constructed and arranged such that said at least one pin extends into the corresponding hole in the bottom surface of the hole saw before said thrust member engages the bottom surface of said hole saw.

8. The hole saw arbor of claim 5 wherein said thrust member includes a collar defining a central hole coaxially received by said enlarged region of said arbor body.

9. The hole saw arbor of claim 1 wherein said adjustable locking member includes a nut and said arbor body includes a threaded portion for receiving said nut.

10. The hole saw arbor of claim 9 wherein said hole saw arbor includes a lock washer and said arbor body includes a slot located between said threaded portion and said shank for receiving said lock washer.

11. The hole saw arbor of claim 1 further including a second movable pin retained by the arbor body in the direction of said threaded shaft for engaging a corresponding hole in the bottom surface of said hole saw to be mounted to said shaft, to prevent rotation of said hole saw relative to said arbor body when so engaged.

12. The hole saw arbor of claim 11 wherein said arbor body includes an enlarged region defining two axially oriented, off-center, through-bores for retaining said pins.

13. The hole saw arbor of claim 12 wherein said pins retained by said arbor body are integrally associated with said thrust member and movement of said thrust member into engagement with the bottom surface of said hole saw extends said pins through said arbor body through-bores and into corresponding holes in the bottom surface of the hole saw.

14. The hole saw arbor of claim 13 wherein said pins and said thrust member are constructed and arranged such that said pins extends into the corresponding holes in the bottom surface of the hole saw before said thrust member engages the bottom surface of said hole saw.

15. A hole saw arbor, comprising:
    an arbor body defining an axial rotation axis and including at one end, a shank for mounting to a drill chuck, and at the other end, a hole saw receiving, axially directed, threaded shaft, said threaded shaft further defining a central bore for receiving a drill bit and a side bore oriented perpendicular to said central bore for receiving a screw for locking said drill bit within said central bore,
    a thrust member, coaxially received by said arbor body, such that said thrust member is movable in the direction of said rotation axis,
    two movable pins integrally associated with said thrust member and retained by the arbor body in the direction of said threaded shaft for engaging corresponding holes in a bottom surface of a hole saw to be mounted to said shaft, to prevent rotation of said hole saw relative to said arbor body when so engaged, said arbor body including an enlarged region defining two axially oriented, off-center, through-bores for retaining said pins,
    an adjustable locking member for locking said thrust member against the bottom surface of said hole saw when said hole saw is engaged with said pins,
    whereby the hole saw, when engaged by said thrust member and said pins, does not wobble off-axis.

16. A method of mounting a hole saw to a hole saw arbor comprising the steps of:
    threading the hole saw onto a threaded shaft of said arbor,
    rotationally fixing said hole saw relative to said threaded shaft, and
    concurrently with said rotational fixing, engaging a bottom surface of the hole saw to lock said hole saw in a longitudinal position.

17. The method of claim 16 wherein said engaging step comprises the steps of:

slidably moving a thrust member into contact with the bottom surface of the hole saw, and locking said thrust member in an operative position in contact with said bottom surface.

18. A method of mounting a hole saw to a hole saw arbor comprising the steps of:

threading the hole saw onto a threaded shaft of said arbor, rotationally fixing said hole saw relative to said threaded shaft, and engaging a bottom surface of the hole saw to lock said hole saw in a longitudinal position, said engaging step comprises the steps of slidably moving a thrust member into contact with the bottom surface of the hole saw, and locking said thrust member in an operative position in contact with said bottom surface.

* * * * *